July 3, 1934.   H. H. WAGNER   1,965,302
BOXED PRODUCT WEIGHING DEVICE
Filed Nov. 7, 1929   2 Sheets-Sheet 1

July 3, 1934. H. H. WAGNER 1,965,302
BOXED PRODUCT WEIGHING DEVICE
Filed Nov. 7, 1929 2 Sheets-Sheet 2
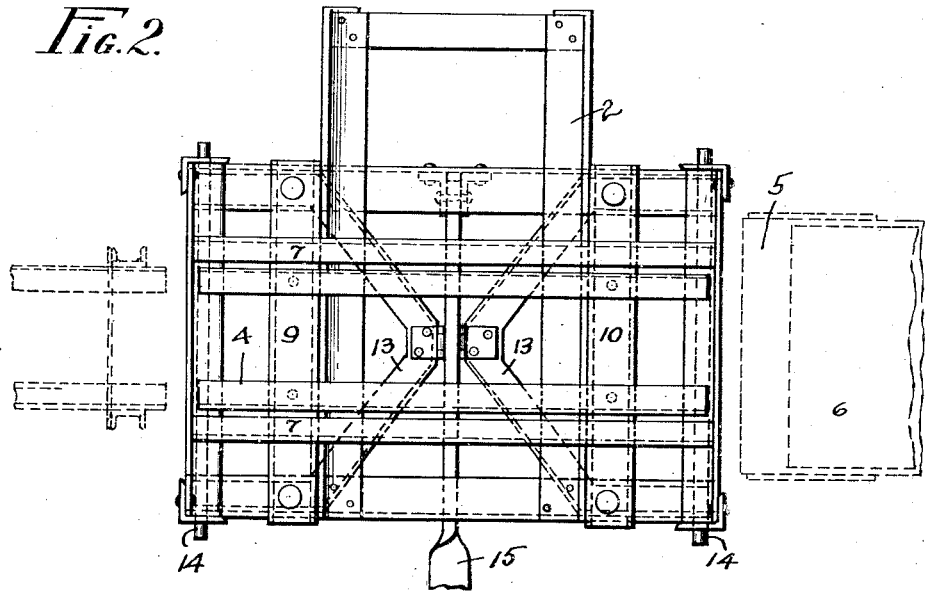
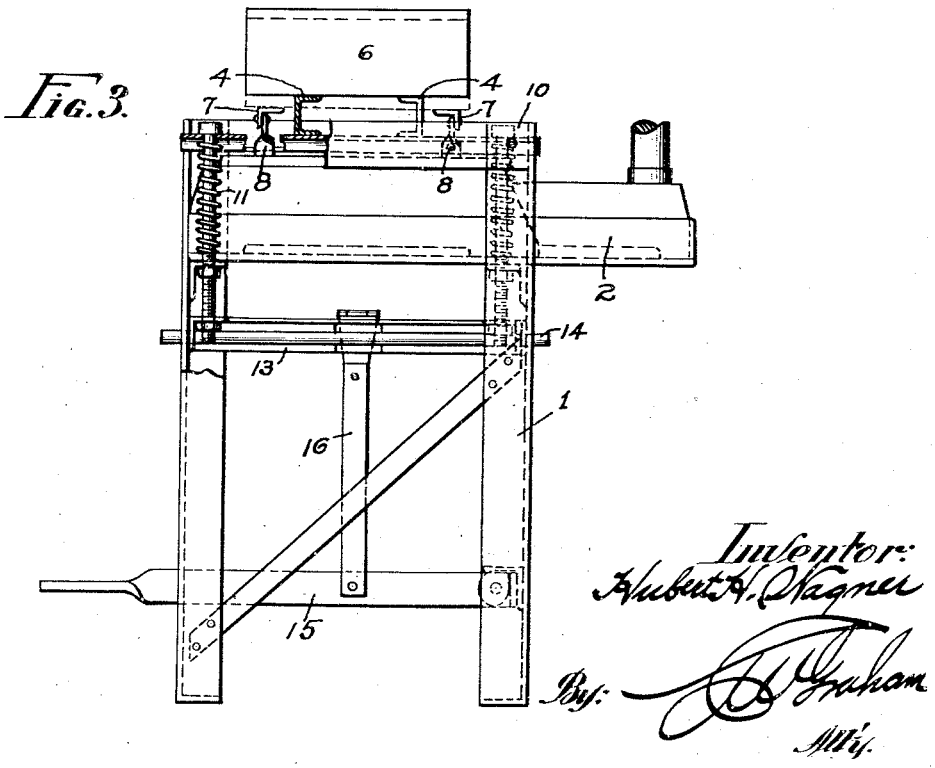

Patented July 3, 1934

1,965,302

UNITED STATES PATENT OFFICE 1,965,302

BOXED PRODUCT WEIGHING DEVICE

Hubert H. Wagner, San Jose, Calif., assignor to Food Machinery Corporation, San Jose, Calif.

Application November 7, 1929, Serial No. 405,360

10 Claims. (Cl. 265—27)

This invention relates to an apparatus for weighing boxed product on its way to a lidding or nailing machine where the covers are applied thereto just prior to shipment and is intended primarily to the weighing of boxed fruit.

The broad principle of the invention contemplates providing a runway for the passage of the boxed product leading from the packing tables to the lidding tables or if automatic machines are employed to the nailing machines where the final closures are applied; of placing in this runway a weighing device where the packed boxes will be momentarily stopped and the weight checked after which they will pass on to the nailing machines, or, if the boxes are hand-nailed, the lids may be applied and hand-nailed at the weighing station, or they may be passed along to a nailing table where other operators will apply the covers and nail them on.

In the invention as applied in this application a platform scale is positioned in the said runway with the weighing platform positioned slightly below a trackway on which the packed boxes slide along the runway. A section of the trackway directly over the scale platform is separate from the other trackway and is depressible by a foot pedal so that as the box is stopped at the weighing station by the operator it will rest on the detached trackway and then by depressing the foot pedal the detached section of trackway will be lowered with the box resting thereon and the box will be temporarily deposited on the platform of the scale, where its weight will be immediately recorded on a visual dial, which is directly before the operator.

If the operator sees that the box is up to weight he will release the foot pedal when the box and the detached section of the runway will return to their normal positions and the box will be passed on to the nailing machines or the hand nailers, or the weighing operator may apply and nail on the lid at the weighing station after he has weighed the box. If he finds that the box is under weight he may add additional product to supply the necessary weight or remove the box for someone else to bring it up to weight when it will be placed on the runway again and passed along with the run of boxes and be rechecked in its turn.

It is therefore a principal object of the invention to provide a weighing device installed in a runway for visually recording the weight of each package passing therealong.

It is also an object of the invention to provide a weighing device placed in a runway wherein the packages are manually diverted from their passage therealong to a weighing platform where the weight may be visually determined.

It is also an object of the invention to provide a weighing device for filled packages wherein a weighing device is placed in the path of movement of a stream of packages and they are depressed vertically from their normal movement and temporarily placed on the platform of said weighing device for a visual evidence of their weight.

It is also an object of the invention to provide a runway along which packed boxes of product may be moved in succession; of placing in said runway a detached section of sufficient extent to hold one single package; of placing a platform scale device under said detached section of runway and providing means whereby a box on said detached section of runway may be transferred temporarily from the said detached section of runway and be deposited on the platform of said scale for the checking of the weight thereof.

It is also an object of the invention to provide a weighing device along the path of a stream of moving filled packages whereby the packages will be momentarily stopped in their movement, removed from the said runway and placed on the platform of a weighing device whereby the weight will be recorded as they are so removed.

With such objects in view as well as other advantages which may be inherent in the invention, consisting in the parts and combinations hereinafter set forth and claimed, it is understood that the several necessary elements and combinations constituting the same may be varied in their proportions, placement and general arrangement without departing from the scope and nature of the invention. In order to make the invention more clearly understood there are shown in the accompanying drawings, somewhat diagrammatically, means and mechanism for placing the same in concrete form, without limiting the improvements in their applications to the particular construction chosen to illustrate the invention.

The drawings accompanying this application are illustrative only, they are not necessarily drawn to scale, neither do they necessarily represent the best engineering and constructive practices employed in the making of such devices, they do, however, illustrate the invention applied in a preferred form, and as such serve to disclose the concept of the invention as applied to an operative device.

Reference now being had to the accompanying drawings a better understanding of the invention will be had.

Figure 1 represents a side elevation of an apparatus embodying the invention wherein is shown a trackway approaching a weighing station which is illustrated herein as a conveyor belt seen at the right of the view; where there is positioned a platform scale, the platform only being shown. This view also shows various parts of the operative elements connected with the weighing of packages, and at the left of the view is seen an extension of the runway for carrying the weighed packages away from the weighing station.

Figure 2 is a plan of Fig. 1 and shows the various parts in substantially the same positions.

Figure 3 is a side elevation looking from the right of Fig. 2.

Figure 1:
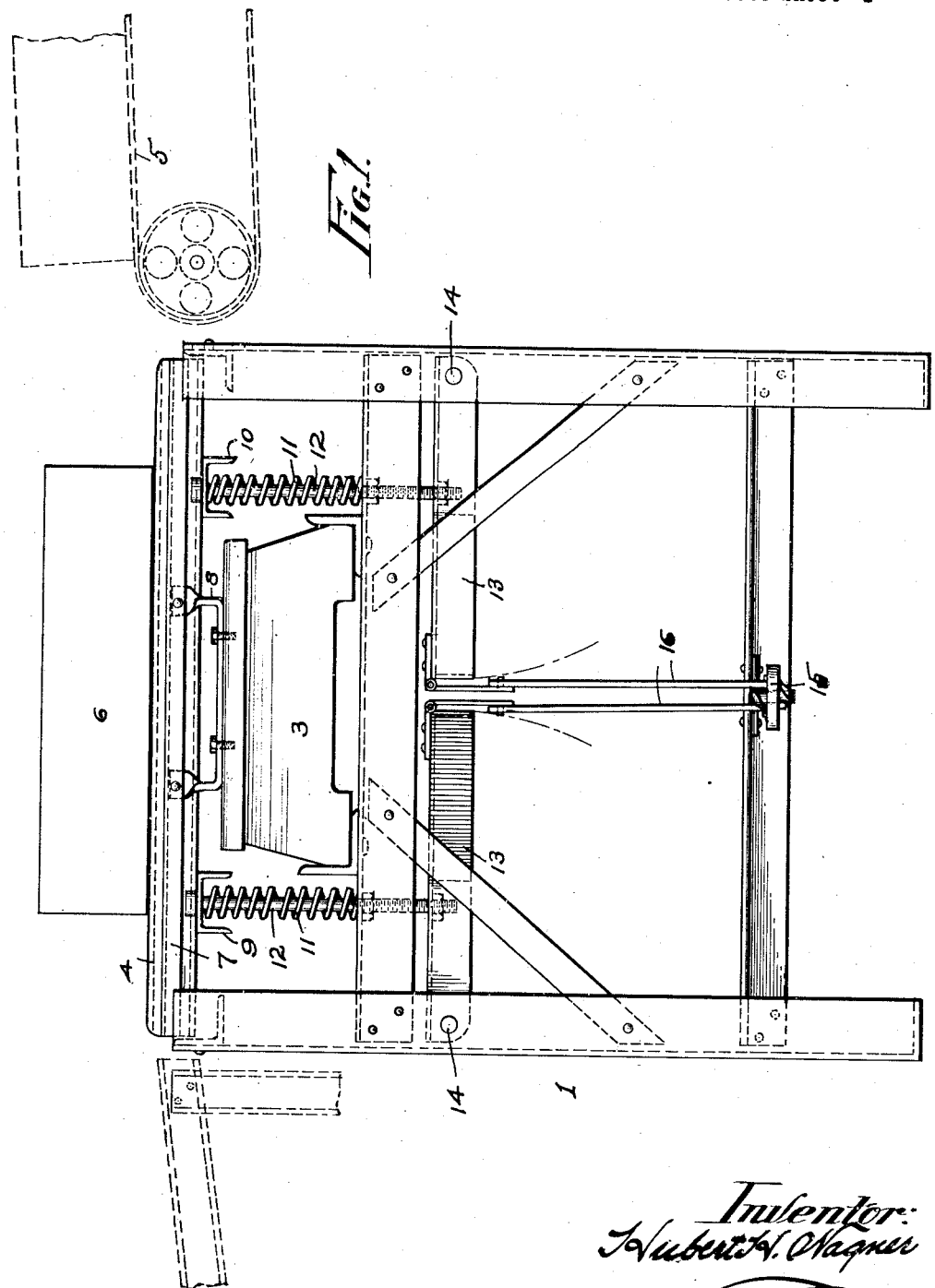
In Fig. 1 a box is shown on the weighing station while in Fig. 2 this has been omitted to more clearly show the structure of the device.

The weighing apparatus comprises a frame member 1 built up in box form to carry the weighing devices and operative elements. Cross members 2 are provided on which the platform scale 3 is mounted. Depressible track rails 4 extend across the top of the frame member 1 in the direction of travel of the packages which pass onto these rails from the conveyor belt 5 and rest for the period of manipulation for weighing as at 6. Parallel to the rails 4 are a pair of rails 7 attached to suitable brackets 8 that are in turn secured to the bed of the platform scale 3. The top surface of the rails 7 is a little below the top surface of the rails 4 so that boxes will not touch the scale device until the operator desires to check the weight of the package.

The rails 4 are depressible by being mounted on cross members 9 and 10 which are in turn supported on the compression springs 11 supported on the rods 12 having their top ends secured to the rails 9 supporting the rails 4 and passing through the members 2 and into fixed connection with the swinging members 13, pivoted in the frame members 1 as at 14 and having swinging movement imparted thereto by the foot pedal 15 and connections 16. The platform scale is shown resting on suitable rails 2 which permit of its easy removal. In Fig. 2 the platform scale has been omitted as has been mentioned to give clarity to the view.

The operation of weighing packages with this device would be substantially as follows when the invention is applied as shown but may vary therefrom if applied to a different structure.

Packages arriving from the conveyor belt 5 are deposited on the depressible rails 4, the operator then depresses the foot pedal 15 when the arms 13 will swing downward carrying with them the bolts 12 to which the rails 4 are attached, when the box 6 will rest temporarily on the rails 7 secured to the scale platform, the rails 4 moving just below the rails 7 so the box will have its accurate weight recorded by the said scale. This record of weight may be only visual as I have mentioned or it may be a tabulated record if desired which may be preserved for future reference or may be inspected at the end of each run or day period to thereby ascertain the daily output of packages and the gross as well as the individual weights of the packages. If provided only with visual record the operator will glance at the scale dial and ascertain instantly if the package is up to weight; if so, then he will release pressure on the foot pedal when the parts will assume their inactive positions and the box may be immediately lidded by this operator, passed on to other operators or to an automatic nailing machine and the next box treated in like manner and so ad infinitum until the run or day is completed.

If a tabulated record is made the weight of each box should also be recorded visually so the operator will be able to pick out the under weight boxes and supply the necessary material to bring them up to weight or remove them from the line to be handled by another operator, or mark them in some way so that the next operator along the line will be notified of their underweight and supply the necessary material to bring them to weight.

What I claim as new and desire to secure by Letters Patent is:

1. An apparatus for checking the weight of packaged product comprising a runway along which packages may be moved in succession, a detached movable portion in said runway for supporting packages thereon in substantial alignment therewith, resilient means holding said detached movable portion of said runway in its normal elevated position, a weighing device located under said detached portion of runway but out of contact with packages thereon, means for lowering said detached portion of runway to transfer a package thereon to said weighing device whereby the weight of said package may be ascertained, said resilient means returning said detached portion of runway to its normal elevated position.

2. An apparatus for checking the weight of packaged product comprising a runway along which packages may be moved in succession, a weighing device located along said runway and below the line of moving packages, means including a part of the runway for temporarily transferring a package from said runway to said weighing device with means below said weighing device for effecting said transfer, other means operable for returning said transferred package to its normal position for movement along said runway.

3. An apparatus for weighing packages that are moved in succession comprising a weighing station, a weighing scale at said station, means for moving packages to said station, means for supporting packages at said station in normal alignment with the line of travel, means for depressing said package support to temporarily deposit a package on said scale to ascertain the weight thereof, other means for then raising said support to pick up the weighed package and return it to position in the line of travel.

4. An apparatus for determining the weight of packaged goods while in transit comprising a runway along which packages are moved in succession, a weighing station along said runway, a movable support for packages when at said weighing station, resilient means for holding said support with a package substantially in the line of travel along said runway, a weighing scale at said weighing station, manually operated means for transferring a package from said resiliently held support to the platform of said weighing scale to ascertain the weight of said package, said resilient means then returning said support to its normal position and carrying the weighed package therewith.

5. An apparatus for checking the weight of packaged goods comprising a runway along which packages may move in succession, a weighing scale located below said runway, means for lowering a section of said runway supporting said package to temporarily deposit the package on the said scale to ascertain the weight thereof, and means for then returning the section of the runway to its normal position with the package resting thereon to continue its movement along said runway.

6. An apparatus for checking the weight of packaged goods comprising a runway along which packages may be moved in succession, a package weighing device located below the line of travel of packages along said runway, a section of said runway mounted for vertical movement, means for imparting vertical movement to said section of runway to lower a package carried thereby onto said weighing device and out of contact with the package to ascertain the weight thereof, yielding means for then returning said runway section to its normal position to again support and permit said package to continue its movement along said runway.

7. A device of the character described comprising, a supporting frame, a scale mounted thereon, a raised package support mounted on the scale, package supporting means overlying the scale and normally elevated above the level of the first mentioned package support, resilient supports for the second mentioned package supporting means disposed on opposite sides of the scale, opposed levers fulcrumed on the frame and actuating means therefor, and connections between the said levers and the supports for the second mentioned package supporting means whereby operation of the levers will depress the second mentioned package supporting means below the level of the first mentioned package support on the scale.

8. A device of the character described comprising, a supporting frame and a scale mounted thereon, and means for lowering a package on to the scale comprising, package supporting means overlying the scale in spaced relation thereto, a bar supporting each end of the last mentioned means, resilient supports inserted between each end of each bar and the supporting frame, opposed levers mounted upon the frame below the scale, connections between the levers and said bars whereby to actuate the same against their resilient supports, and means for simultaneously operating the opposed levers.

9. A device of the character described comprising, a supporting frame, spaced cross bars mounted thereon, spaced and opposed guides mounted on the bars to support a scale, package supporting means overlying the guides, a bar supporting each end of the package supporting means, resilient supports for said bars, and means for depressing the bars against their resilient supports comprising, a pair of opposed levers fulcrumed on the frame with their central portions approaching each other in the center of the frame, connecting means between the levers and the bars, and means for simultaneously actuating the levers to depress the bars.

10. An apparatus for checking the weight of packages being moved along a runway, comprising a weighing device located underneath said runway, a package support located over said weighing device and out of contact therewith or with said runway, means for lowering said support and a package to temporarily transfer the package from the support to the weighing device to ascertain the weight thereof, means for then raising the said support to pick up said weighed package and return it to position for movement along said runway.

HUBERT H. WAGNER.